(12) United States Patent
Janakiraman et al.

(10) Patent No.: US 11,641,365 B2
(45) Date of Patent: May 2, 2023

(54) HYBRID INTRUSION DETECTION MODEL FOR CYBERATTACKS IN AVIONICS INTERNET GATEWAYS USING EDGE ANALYTICS

(71) Applicant: Honeywell International Inc., Morris Plains, NJ (US)

(72) Inventors: Kirupakar Janakiraman, Madurai (IN); Narayanan Srinivasan, Tamil Nadu (IN); Nayyar Rao, Bangalore (IN); Rajeev Mohan, Bangalore (IN); Srihari Jayathirtha, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 215 days.

(21) Appl. No.: 17/037,186

(22) Filed: Sep. 29, 2020

(65) Prior Publication Data
US 2021/0112083 A1    Apr. 15, 2021

(30) Foreign Application Priority Data

Oct. 10, 2019   (IN) .............................. 201941040973

(51) Int. Cl.
*H04L 29/06* (2006.01)
*H04L 9/40* (2022.01)

(52) U.S. Cl.
CPC ........ *H04L 63/1416* (2013.01); *H04L 63/029* (2013.01); *H04L 63/1441* (2013.01)

(58) Field of Classification Search
CPC .............. H04L 63/1416; H04L 63/029; H04L 63/1441
See application file for complete search history.

(56) References Cited

U.S. PATENT DOCUMENTS

| | | | |
|---|---|---|---|
| 7,725,936 B2 | 5/2010 | Banerjee et al. | |
| 8,903,593 B1 | 12/2014 | Addepalli et al. | |
| 10,554,507 B1* | 2/2020 | Siddiqui | H04L 63/1433 |
| 2004/0230834 A1* | 11/2004 | McCallam | H04L 67/306 |
| | | | 709/224 |
| 2016/0217022 A1* | 7/2016 | Velipasaoglu | H04L 41/16 |
| 2018/0309818 A1* | 10/2018 | Park | H04L 43/08 |

(Continued)

OTHER PUBLICATIONS

Sedjelmaci, Hichem, Sidi Mohammed Senouci, and Mohamad Al-Bahri. "A lightweight anomaly detection technique for low-resource IoT devices: A game-theoretic methodology." In 2016 IEEE international conference on communications (ICC), pp. 1-6. IEEE, 2016. (Year: 2016).*

(Continued)

*Primary Examiner* — Kambiz Zand
*Assistant Examiner* — Afaq Ali
(74) *Attorney, Agent, or Firm* — Bookoff McAndrews, PLLC

(57) ABSTRACT

Techniques are provided for detecting an intrusion event in a network. At a gateway device in the network, performance parameters of the gateway device are monitored. Steady-state operations are defined based on expected performance of the device parameters. The steady-state operations are compared to the monitored device performance and other context parameters. A hybrid network intrusion detection technique is activated to determine a presence of the intrusion event for known and unknown attacks.

20 Claims, 6 Drawing Sheets

(56) References Cited

U.S. PATENT DOCUMENTS

2020/0233735 A1\* 7/2020 Zhang ................. G06F 11/3447
2020/0403991 A1\* 12/2020 Sohail ................. H04L 63/1433

OTHER PUBLICATIONS

Dibaei, Mahdi, et al. "An overview of attacks and defences on intelligent connected vehicles." arXiv preprint arXiv:1907.07455 (2019). (36 pages, in English).

Nguyen, Thanh Thi, et al. "Deep reinforcement learning for cyber security." arXiv preprint arXiv:1906.05799 (2019). (16 pages, in English).

Sharma, Sparsh et al. "A survey on Intrusion Detection Systems and Honeypot based proactive security mechanisms in VANETs and VANET Cloud." Vehicular communications 12 (2018): 138-164. (27 pages, in English).

Sedjelmaci, Hichem et al. "A lightweight anomaly detection technique for low-resource IoT devices: A game-theoretic methodology." 2016 IEEE international conference on communications (ICC). IEEE, 2016. (6 pages, in English).

Extended European Search Report dated Feb. 8, 2021 in counterpart European Patent Application No. 20200650.8 (11 pages, in English).

\* cited by examiner

HYBRID INTRUSION DETECTION MODEL FOR CYBERATTACKS IN AVIONICS INTERNET GATEWAYS USING EDGE ANALYTICS

CROSS-REFERENCE TO RELATED APPLICATION(S)

This patent application claims the benefit of priority under 35 U.S.C. § 119 from Indian Patent Application No. 201941040973, filed on Oct. 10, 2019, the contents of which is incorporated by reference in its entirety.

TECHNICAL FIELD

Various embodiments of the present disclosure relate generally to Internet of Things (IoT) systems and networks. More specifically, this disclosure relates to detecting security threats on IoT systems.

BACKGROUND

Control and automation systems are routinely used to automate large or complex processes. These systems have evolved from closed proprietary systems in the early 1990s to more convenient, connected, and open systems. The current trend involves (i) moving these systems to cloud computing environments and (ii) using Internet of Things (IoT) devices within these systems.

In today's IoT world, IoT providers direct their focus towards connecting devices, extracting data from those devices, and sending the data to the cloud for analytics. However, just as traditional network devices are vulnerable to network attacks, IoT devices, and particularly IoT gateways are vulnerable to security threats. IoT gateways are not standard computers that can benefit from using anti-virus or other protection software. Thus, there is no standard software to protect IoT gateways from known and unknown network attacks with less resource footprint.

SUMMARY OF THE INVENTION

According to certain aspects of the disclosure, systems and methods are disclosed for assessing security threats to Internet of Things (IoT) edge devices (e.g., gateway devices).

For instance, a method for detecting an intrusion event in a network may include: at a gateway device in the network, monitoring device performance and other context parameters of the gateway device; defining a steady-state operation based on expected performance of the device parameters; comparing the steady-state operation to the monitored device performance and context parameters; and activating a hybrid network intrusion detection technique to determine a presence of the intrusion event.

The hybrid network intrusion detection system may include a device comprising: an interface unit configured to receive information; a data storage device storing instructions; and a processor configured to execute the instructions to: monitor device performance and context parameters of a gateway device; define a steady-state operation based on expected performance of the device parameters; compare the steady-state operation to the monitored device performance and context parameters; and activate a hybrid network intrusion detection technique to determine a presence of the intrusion event.

The non-transitory computer-readable medium stores instructions that cause the server device to perform operations. These operations comprise: monitoring device performance and context parameters of a gateway device; defining a steady-state operation based on expected performance of the device parameters; comparing the steady-state operation to the monitored device performance and context parameters; and activating a hybrid network intrusion detection technique to determine a presence of the intrusion event.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description.

It should also be appreciated that this disclosure may describe systems and methods that are applicable to aircraft operations (e.g., IoT networks for aircraft and for avionic systems generally). It should be appreciated that the present systems and methods are applicable to security of any vehicle management system, including those of drones, automobiles, trains (locomotives), or any other autonomous and/or Internet-connected vehicle. The present disclosure is not limited to IoT networks for vehicles and is applicable generally to all IoT networks.

As described above, there is a need in the field of industrial processes for systems and methods for detecting network intrusion events, particularly in an Industrial Internet of Things (IoT) network. The network intrusion techniques may be used to determine a malicious network attack or other unwanted or unforeseen network intrusion on network devices, such as an IoT gateway device or an IoT edge device. The following systems and methods provide more precise insight into processes and components that aid in the execution of these techniques.

The figures discussed below, and the various embodiments used to describe the principles of the present disclosure in this patent document are by way of illustration only and should not be construed in any way to limit the scope of the invention. Those skilled in the art will understand that the principles of the disclosure may be implemented in any type of suitably arranged device or system.

Figure 1:
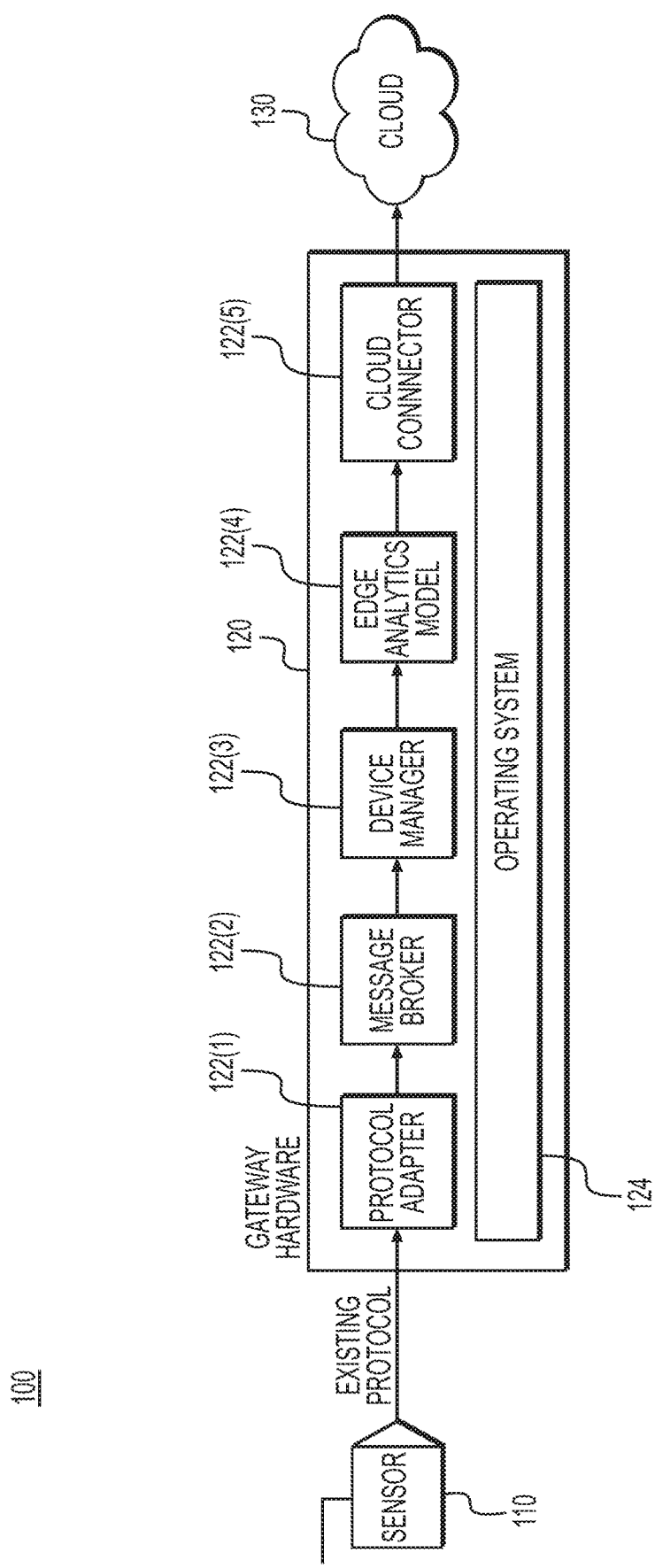
FIG. 1 shows an example architecture between one or more sensors, a gateway device, and the cloud of an Internet of Things (IoT) platform, according to one or more embodiments.

FIG. 1 shows an example network architecture 100 with a sensor device 110 ("sensor"), a gateway device 120 ("gateway"), and a cloud 130. The network architecture ("network") 100 may be an Internet of Things (IoT) network, wherein one or more computing devices are configured to communicate with other devices and network connected elements over a wide area network (such as the Internet). An IoT network, such as network 100, consists of three layers: a cloud layer, a network layer, and an edge device. In one example, FIG. 1 shows an IoT cloud layer represented by cloud 130, shows the sensor 110 that may be a part of the IoT network layer, and shows the gateway device 120 may be an edge device that is part of the edge layer. The terms "gateway device" and "edge device" and the terms "gateway" and "edge" may be used interchangeably herein.

In FIG. 1, the sensor 110 is configured to communicate with the gateway 120 via an existing network protocol. The gateway 120 has a plurality of modules, shown at reference numerals 122(1)-122(5). For example, the gateway 120 may have a protocol adapter module 122(1), a message broker module 122(2), a device manager module 122(3), an edge analytics model module 122(4), and a cloud connector module 122(5). The gateway 120 also has an operating system, shown at reference numeral 124. Though not shown in FIG. 1, a monitoring server may be in communication with the gateway 120 (e.g., via cloud 130) to perform the hybrid network intrusion detection techniques described herein. In another example, the gateway 120 itself is configured to perform the hybrid network intrusion detection techniques. For simplicity, the description here describes the gateway 120 performing the hybrid network intrusion detection techniques.

Traditionally, an edge platform of an IoT network may be an embedded system or a server class system. An edge platform may include a central processing unit (CPU), memory, storage, and network connections to a cloud layer (e.g., the cloud 130), connections to controllers, devices, and/or sensors (e.g., sensor 110). The edge platform runs command and control applications as well as network analytics modules, and sends device generated telemetry data to the cloud network 130. Similarly, data originating in the cloud 130 may be sent to network devices (e.g., the sensor 110), via the edge platform and specifically via edge devices such as the gateway 120. Thus, it is critical for IoT network security to detect potential malicious attacks or other network intrusion events that target the edge platform and edge devices of the IoT network 100.

For example, in today's IoT world, IoT providers may be focused on connecting devices and extracting data from network devices such as the sensor 110 and may desire to send data extracted from these devices to the cloud 130 for data analytics operations. Thus, it is increasingly important to protect IoT networks from intrusion events. An infamous example of an IoT network intrusion event is the Mirai botnet attack in 2016 that compromised roughly 100,000 IoT devices by repurposing IoT network devices into a botnet. There are many types of potential network attacks that target edge devices. For example, edge devices can be exploited due to the implicit trust that is shared between IoT network devices. Gateway devices are also vulnerable to distributed denial of services (DDOS) attacks, spoofing, tampering, information disclosure compromises, malicious elevation of privilege, and botnets.

Traditional attack prevention techniques involve cryptographic algorithms deployed on network devices to counter network attacks. However, such algorithms may have high power computational demands and may require specialized hardware on every network device to execute the cryptographic algorithms. Thus, a solution is desired that accomplishes the goals of network security and that provides scalability in implementation across IoT gateway/edge devices. Low power IoT edge devices are highly secure if they have several aspects. For example, highly secure devices may have one or more attributes: hardware-based root of trust, a small trusted computing base, depth of defenses, compartmentalization, certificate-based authentication, renewable security, and failure reporting.

For root of trust attributes, hardware has two important properties that are used to establish device security. First, single purpose hardware is immune to reuse by an attacker for unintended actions. Second, hardware can detect and mitigate against physical attacks. For example, pulse testing can be implemented on a reset pin of a network device to prevent "glitching" attacks. Thus, hardware provides a solid root of trust upon which rich software functionality can be implemented securely and safely.

For trusted computing base attributes, trusted computing base (TCB) consists of all the software and hardware used to create a secure environment for an operation. The TCB is often kept as small as possible to minimize the surface that is exposed to attackers and to reduce the probability that a bug or feature can be used to circumvent security protections. For defense in depth attributes, hardware devices may have multiple layers of countermeasures to protect against an intrusion event.

For compartmentalization attributes, hardware may have enforced boundaries to prevent a flaw or breach in one software compartment from propagating to other software compartments of the system. Compartmentalization introduces additional protection boundaries within the hardware and software stack to create additional layers of defense in depth. For example, a common technique is to use operating system processes or independent virtual machine as compartments.

For certificate-based authentication, certificates instead of passwords, are used to prove identities for mutual authentication when communicating with other local devices and with servers in the cloud. A certificate is a statement of identity and authorization that is signed with a secret private key and validated with a known public key. Unlike passwords or other authentication mechanisms that are based on shared secrets, certificates cannot be stolen, forged, or otherwise used to authenticate an imposter. Additionally, secure hardware has renewable security attributes that can update to a more secure state automatically even after a device has been compromised. Security threats evolve and attackers discover new attack vectors. To counter emerging threats, device security must be renewed regularly. For failure reporting attributes, when a failure occurs on a network device, a failure report is collected automatically and sent to a failure analysis system in a timely manner. A failure analysis system may correlate failure reports that have similar root causes. With a sufficiently large reporting base, even extremely rare failure events can be diagnosed and corrected, and new attack vectors can be identified and isolated before they are widely exploited. Failure reporting creates a global "immune system" for highly secure devices.

The techniques described herein propose a hybrid network intrusion detection system to identify network intrusion events (e.g., malicious network attacks to an IoT gateway) and to take appropriate countermeasures. In general, the techniques described herein accomplish the security measure attributes described above. The hybrid network intrusion detection system leverages a smaller hardware footprint to perform cyber-attack analytics and uses a combination of signature based detection techniques and anomaly detection techniques to detect a network attack with high accuracy. Additionally, the hybrid model techniques described herein mitigate cyber security threats to IoT networks by identifying known and unknown attacks.

Figure 2:
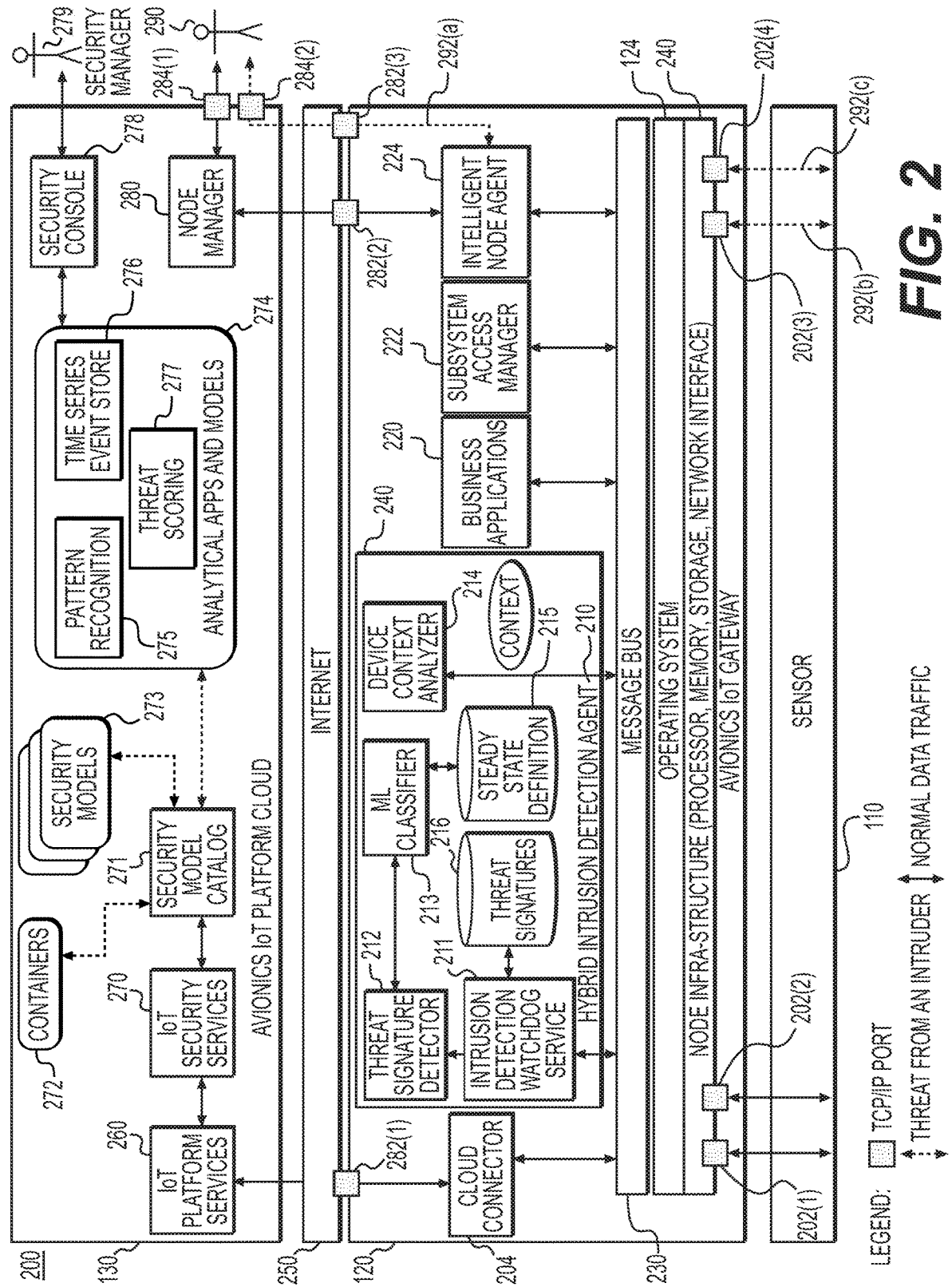
FIG. 2 shows an example block diagram of a system for a hybrid network intrusion detection model for an IoT gateway, according to one or more embodiments.

Reference is now made to FIG. 2 which shows a first example system 200 for the hybrid network intrusion detection model. FIG. 2 shows a sensor (e.g., sensor 110), the gateway 120, and the cloud 130, described in connection with FIG. 1. The sensor 110 may represent one or more avionics device or sensor. In FIG. 2, sensor 110 communicates with the gateway 120 via one or more ports 202(1)-202(4) shown in FIG. 2. In one example, the ports 202(1)-202(4) may be transmission control protocol/internet protocol (TCP/IP) ports.

The gateway 120 may include functional modules such as, for example, a cloud connector 204, a hybrid network intrusion agent 210, business applications 220, subsystem access manager 222, and intelligent node agent 224. The hybrid network intrusion agent 210 may have additional components/modules. For example, the hybrid network intrusion agent 210 may have an intrusion detection watchdog service 211, a threat signature detector 212, a machine learning (ML) classifier 213, a device context analyzer 214, a steady-state definition database 215, and a threat signature database 216. These functional modules are connected by message bus 230. The gateway 120 also has an operating system 124 (described in connection with FIG. 1), and other infrastructure components shown generally at 240 (e.g., processor, memory, storage, network interface unit, etc.).

The gateway 120 communicates with the cloud 130 over a network, e.g., the Internet represented at 250. The cloud 130 has several modules, including an IoT platform services module 260, an IoT security services module 270, a security model catalog 271, containers 272, security models 273, analytical apps and models 274, pattern recognition 275, time series event store 276, threat scoring 277, security console 278, security manager, 279, and node manager 280. The IoT platform services module 260 are configured to communicate with each other. The gateway 120 and the cloud 130 communicate with each other via one or more network ports 282(1)-282(3). The cloud 130 communicates to external entities (e.g., other devices in an IoT network) via ports 284(1) and 284(2)

FIG. 2 also shows an intruder. The intruder 290 is a malicious actor (human or computer) that is attempting to gain unauthorized access to the gateway 120 and the sensor 110 via the cloud 130 (e.g., to launch an attack on an IoT network). FIG. 2 also shows a plurality of paths at 292(a)-292(c) at which a network intrusion event may occur. For example, a network attack may come from two sides: from the cloud 130 or from the sensor 110. From a cloud-side attack, the intruder 290 may know how to open a port (e.g., port 284(2)) and may start sending malware through that port to the gateway 120 and the sensor 110. From a sensor-side attack, compromised or malicious devices may use open ports (e.g., ports 202(3) and/or 202(4)) and to send malware data to the gateway 120. The techniques described herein implement a hybrid network intrusion detection model to identify these and other types of network attacks that may be known or unknown to the gateway 120.

Figure 3A:
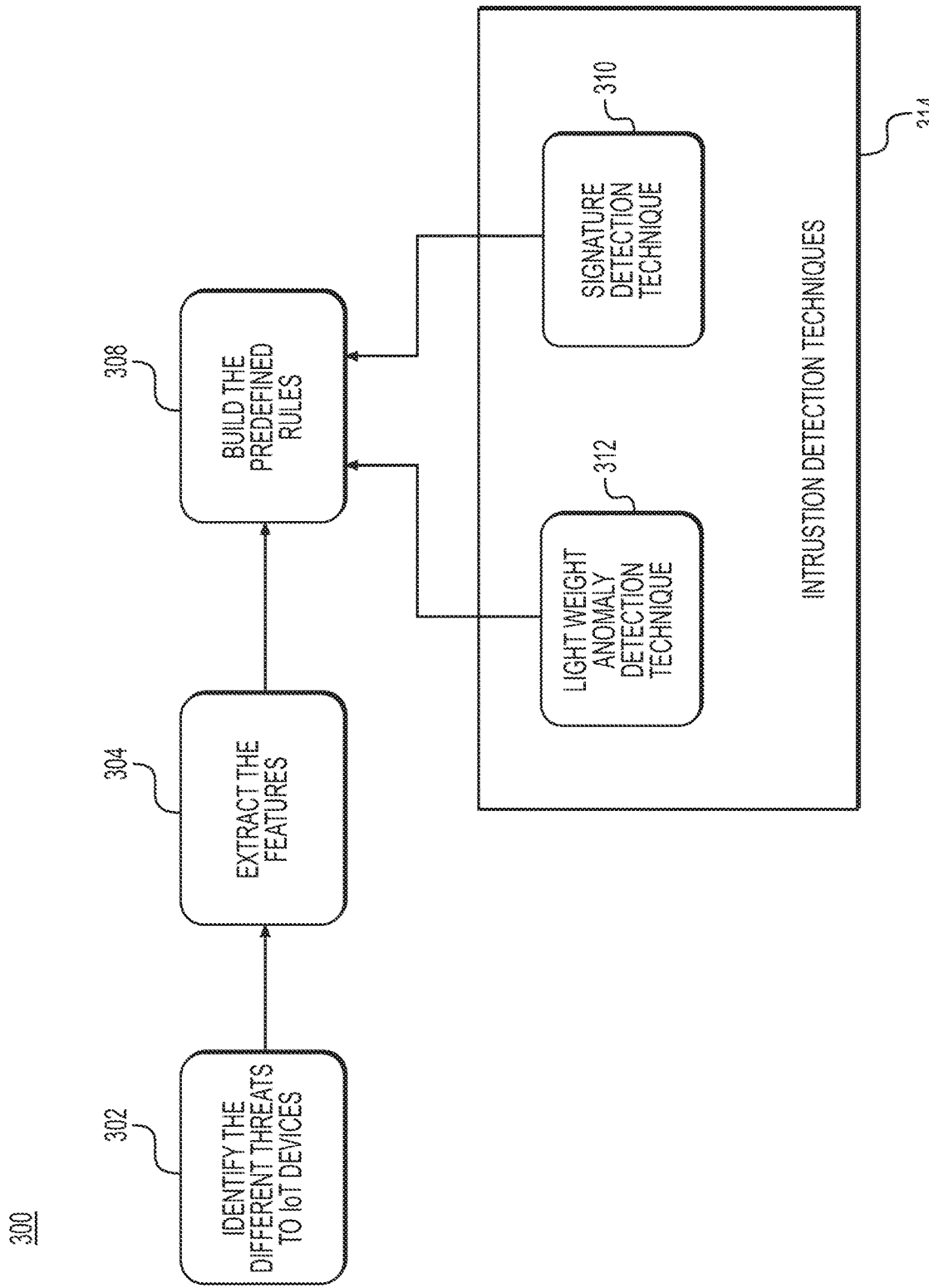
FIGS. 3A and 3B shows an example flow diagram representing techniques for performing an intrusion detection analysis, according to one or more embodiments.

Reference is now made to FIG. 3A. FIG. 3A shows a first example flow diagram 300 that represents techniques for performing a hybrid network intrusion detection analysis. In one example, the hybrid network intrusion detection analysis may be performed by a device (e.g., a server) in communication with the gateway 120. In another example, the hybrid network intrusion detection analysis may be performed by the gateway 120 itself. For simplicity, the hybrid network intrusion detection analysis is described herein as being performed by the gateway 120 itself, though it should be appreciated that a similar description is applicable to a monitoring server in communication with the gateway 120.

In FIG. 3A, at reference 302, the gateway 120 identifies different potential threats to IoT devices. At reference numeral 304, the gateway 120 monitors its performance attributes and extracts performance features related to the performance attributes. For example, the gateway 120 utilizes the device context analyzer module 214 to monitor performance attributes. At reference numeral 306, the server device builds predefine rules (e.g., rules associated with known network intrusion event), and at 308, implements intrusion detection techniques. For example, at reference numeral 310, the gateway 120 performs a signature detection technique and at operation 312, performs a light weight anomaly detection technique ("anomaly detection technique"). The signature detection technique and the light weight anomaly detection technique together comprise the hybrid network intrusion detection analysis, represented at 314.

The signature based detection is based on a detection of a network attack by comparing the behavior of an analyzed target (e.g., the gateway 120) to a set of predefined rules related to each attack signature. For example, a database, such as threat signature database 316 in FIG. 2, may store signatures for known network attacks. A signature may be generated for each type of network attack, and the behavior of an analyzed target (e.g., the gateway 120) may be compared to the signatures to determine whether a known network attack has occurred. This technique aims to reduce the false positives and requires a low computation overhead to model the normal behavior of the gateway 120. This technique, however, can only detect known attacks that are described by a set of signatures.

The anomaly detection technique 312 utilizes algorithms, such as data mining, support vector machine (SVM), and neural networks (NNs) to build normal behavior (e.g., accomplished by the ML classifier 213 in FIG. 2). The advantage of such techniques is a high detection rate since it has the ability to detect new attacks that have never occurred before. The main drawback of this technique, however, is the relatively high computation overhead required to model the normal behavior. However, the techniques proposed herein will activate the anomaly detection only when a new attack pattern (i.e., signature) is detected. These techniques rely on a learning algorithm to carry out a training and classification process. In the training process, logic on a device (e.g., the gateway 120 or a server in communication with the gateway 120) such as an intrusion detection system (IDS) monitors the features and behaviors of the gateway 120 (or other IoT device) and models a normal and abnormal behavior of a target device. In the classification process, the anomaly detection technique classifies the new features according to the anomaly and the normal patterns that are determined during a training phase. In case a new attack pattern is detected, the monitoring device builds a rule related to each new detected attack pattern. In one example, with the aid of strategies such as utilizing a Nash equilibrium, the monitoring device can activate its anomaly detection technique to detect new attack patterns.

As stated above, the techniques described herein may relate to any IoT network, and in one example, may be applicable to IoT avionics networks. For example, the gateway 120 may be an avionics IoT gateway. A context analyzer in an avionics gateway may correlate attributes along with original data to arrive at a context. The monitoring server may be responsible for performing situational analysis to identify metadata of the IoT network (including operations of the IoT gateway), such as in the form of a Sentience Domain Language (SDL). For example, the following contexts or attributes may be observed for the IoT gateway 120: avionics IoT gateway subsystem information/parameters, avionics IoT gateway super system information, aircraft ontology information, avionics IoT gateway performance data, and data-drive context change information. Avionics IoT gateway subsystem information may include subsystem parameters, such as point detail information, metadata of the operational context, deployed components, resource profiles, etc. Avionics IoT gateway super system information may comprise environmental parameters such deployment contexts, execution environment, neighbor components, and other external parameter information. Aircraft ontology information may include domain-related asset model information, including domain ontology data/metadata, ontology standards such as industry foundation classes and building information model (BIM) database schema. Avionics IoT gateway performance data may include performance profiling information, such as memory/CPU footprint, Internet requirements, and other similar resource utilizing information. Data-driving context change information may include a set of rules that impacts the system context based upon the complex events that were received by the system under consideration.

As stated above, the hybrid network intrusion analysis uses a combination of signature based intrusion detection and machine learning based anomaly detection. Thus, the hybrid network intrusion detection agent (referred to above in connection with FIG. 2), is configured with the threat signature detector 212 and the ML classifier 213. Thus, the hybrid network intrusion analysis activates an anomaly detection technique only when a new attack signature is expected to occur. The IDS agent, which is based upon methodologies like a game theory approach, activates its anomaly detection against suspected nodes and ejects the malicious attacker before raising a cyber-attack. The gateway device 120 can use edge context expressions to refine the required models from a catalog of cyber-attack profile models in the edge or cloud. The hybrid IDS agent will utilize one or more ML models to apply in the live complex event processing stream. The models can be downloaded in an on-required basis depending on the local context.

Figure 3B:
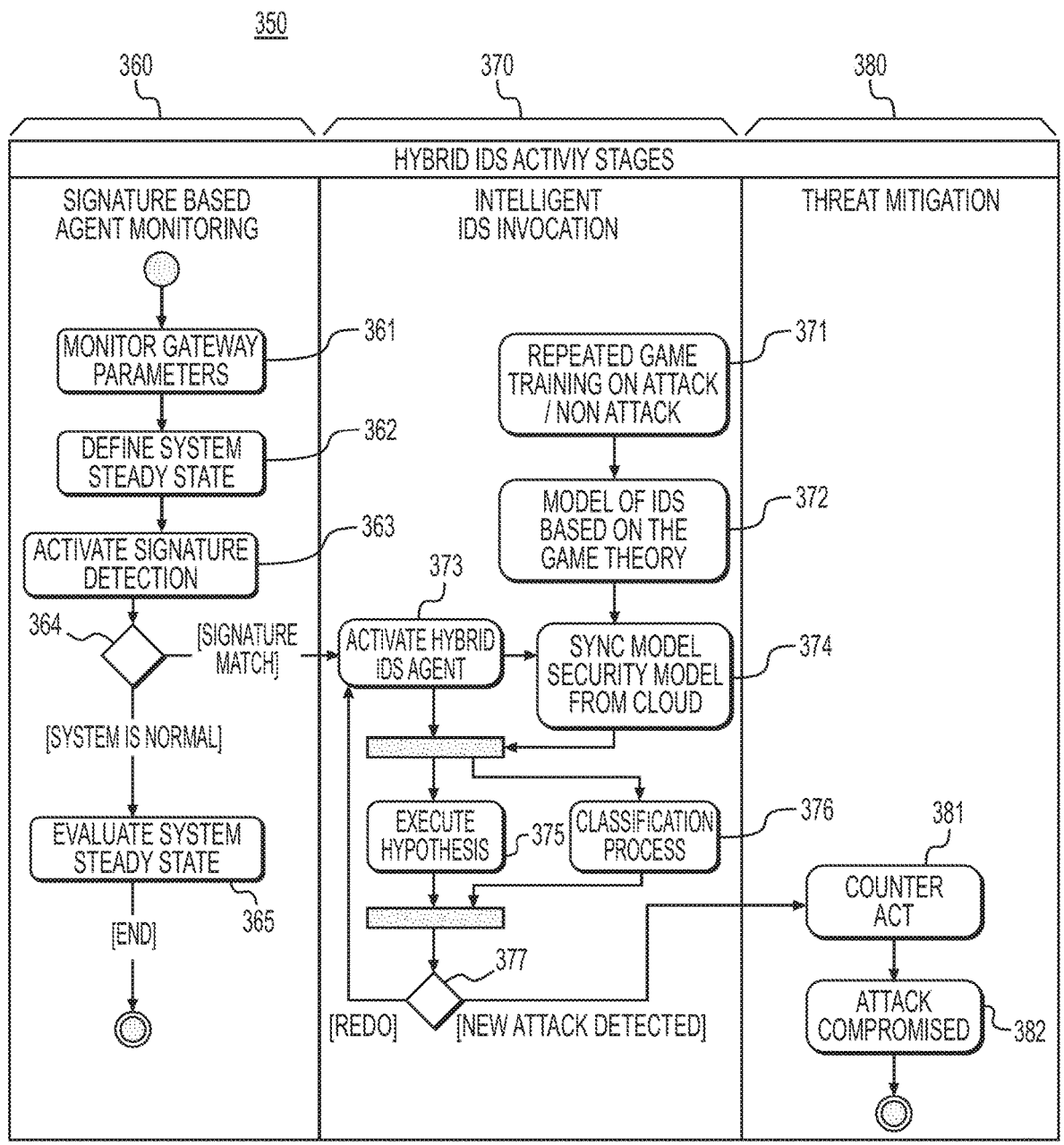

Reference is now made to FIG. 3B which shows a flow chart 350 explaining the hybrid network intrusion detection process. As shown in the flow chart 350, the hybrid network intrusion detection process occurs in three stages. The first stage 360 is a signature based agent monitoring. The second stage 370 is an invocation of an intelligent analysis. The third stage 380 involves threat mitigation.

In the first stage 360, at operation 361, parameters of the IoT gateway 120 are monitored, e.g., by the gateway 120 itself. At operation 362, the gateway 120 defines a steady-state system of expected operations of the IoT gateway 120. At 363, the gateway 120 activates a signature detection operation and at 364 determines whether or not there is a signature match. If there is not a signature match, the gateway 120 continues to evaluate the steady state system, as shown at 365. If there is a signature match, the operations proceed to the second stage 370.

In the second stage 370, the gateway 120 performs repeated training on network attack/non-network attack scenarios, as shown at 371. A model is generated based on the game theory at 372. At 373, a hybrid detection agent is activated when there is a signature match from operation 364, above. After the hybrid detection agent is activated, at operation 374 the model generated in operation 372 is synchronized with security model from the cloud. At operation 375, a machine learning hypothesis is executed, and simultaneously, at operation 376, a classification process is initiated to classify the gateway parameters monitored at operation 361. At operation 377, a determination is made as to whether the monitored gateway parameters indicate a new attack. If not, the process reverts to operation 373. If a new attack is detected, the process proceeds to the third stage 380. At operation 381, the counteractive operations are initiated to thwart the detected new attack, and at operation 382, the new attack is compromised.

The following provides a description on how the model of IDS is trained using game theory. There are two components involved in building an IDS model for the hybrid intrusion detection methodology: (A) intrusion detection and (B) a game theory model. For purposes of this model, an attacker and an IoT gateway are considered as game opponents.

A. Intrusion Detector

The intrusion detector in the IoT node (e.g., the gateway 120) uses a detection means to audit data from the centralized data bus, detects a network intrusion event, submits the test results, and determines whether a threat exists. The node also provides the results to a game theory model. The game theory model simulates the interaction of an attacker and a defender, and weights the test results and detection efficiency from the intrusion detector (e.g., the rate of correct and incorrect detection). The node uses a Nash equilibrium to assist the IDS to make a reasonable response.

B. Game Theory Model

Game theory studies the decision of decision-making interactive behavior and equilibrium problems to maximize utility value. Game theory has five elements: participants, space of strategies, distribution of probability, information collection, and utility function. The expansion of the game theory model of the gateway 120 can be expressed by five elements: G={{A,D}, {SA,SD}, {PA,PD}, {IA,ID}, {RA, RD}}.

{A,D} states the decision-making subject in the first element in the game. "A" stands for an "attacker," and "D" stands for "defenders" of an IDS response.

{SA, SD} stands for the second element strategy. "SA" stands for the strategy of the attacker, and "SD" stands for the strategy of the defenders. Strategy is a contingent action plan which can be used by participants in the game that can be displayed by a vector.

{PA,PD} states the probability distribution of the third element. The probability distribution matrix P can be represented by a distribution matrix that evolves from a data of intrusion detector monitoring a network. This provides attack classification information for the IDS and detector classification.

{IA,ID} states the information set of the attacker and the defender of the fourth element. The defenders, provided with information by the detector, cannot see the attacker's behavior. The dimension of information set is decided by the number of attack types.

{RA, RD} states the utility function of the fifth element, namely, the possible gain set of the attacker and the defender after the game. In each game, a real number is used for showing the income of both sides in the set. This is of primary importance in the game theory model.

Concepts like the Nash Equilibrium are applied on the above-mentioned game theory approach. For example, in the standard game participants: G={S1 . . . , Sn; U1 . . . Un}, strategy s*i of any game party i is the best the rest of the game, namely, ui(s*1 s*i . . . , s*n)≥uj(s*1, . . . , s*j . . . , s*n) suited for all si∈sj which can be called as a Nash equilibrium for G. In this model, attack type of the attacker is limited. So is the information dimension correspondingly. The corresponding strategy game is also limited. Per the existence principle of Nash equilibrium, there exists at least one strategy Nash equilibrium in any limited strategy game. Only when the attacker and the defender achieve Nash equilibrium strategy can they make the income maximized.

A limited secondary repeated game model is established of a complete information, set: G={N, S1, S2, U1, U2}. N={A, D}. A represents Node attack and D on behalf of the IDS, if both sides are reasonable and intelligent enough; S1 and S2 on behalf of the strategy sets of both sides respectively. The network has N IoT Gateway nodes. Any node k has m targets (Sensors, Actuators, resources etc.) to measure, set a, b, c . . . , m. Any node k, the attacker has two strategies (attack or not attack). The corresponding IDS also has two strategies (defense or not defense).

The order of participants who make decisions and implement decision activities in the game varies. At the same time, both sides of decision may choose a static game, the order of strategy choice of both sides. The latter actors may choose dynamic games after detecting the strategy of the other side. The game of the whole security simulation in this case on an IoT gateway device is repeated and is dynamic. Repeated games will be conducted on this same methodology and repeated game means the game with the same structure repeats many times. Every game is called "stage game" or the original game, i.e., equal in the set of participants, strategic space, and revenue function. Equilibrium path of repeated game is made up of action combination series of every gamer and gross income of repeated game can be used for showing overall income. These responses will be recoded as standard rules over the identification pattern. And the model which is getting built with this training methodology is capable of identifying both known and unknown attack patterns.

They hybrid network intrusion detection techniques has several benefits The coming decade will likely see the deployment of many IoT gateways, e.g., onboard aircraft, which will send large amounts of telemetry data to an avionics cloud. In many cases, the use of battery power is at premium and it is not possible to employ a continuously running algorithm that watches incoming data against known signatures. The hybrid intrusion detection system will help in this situation. Achieving cyber-attack protection in low power IoT edge devices will enable large number of IoT edge devices to get into production in a rapid manner. IDS hybrid models that become standard components can be distributed and used across different hardware and software platforms to solve a variety of issues related to cyber security exploits. Security audit components can be downloaded into an IoT gateway only when needed, which creates new opportunities in the security name space where situation awareness provides additional dimensions for approaching threats in real time. Costs are reduced in edge/gateway hardware by optimizing security runtime needs since the CPU/memory demands are reduced because the components are consumed only on demand. As a new device type is connected, a containerized model that can work with that device can be downloaded. This "just in time" approach makes the system responsive to change and improves user satisfaction.

Figure 4:
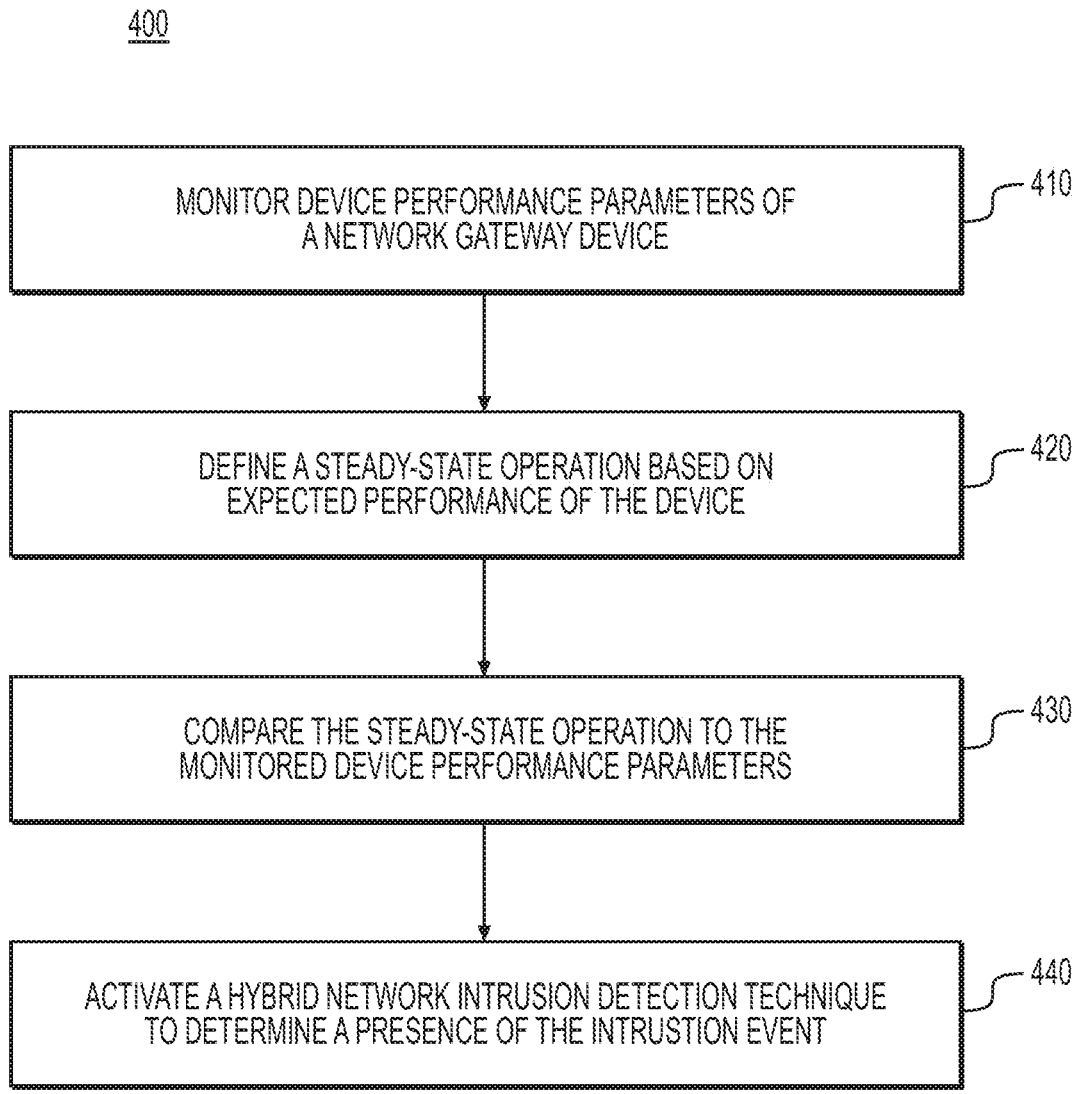
FIG. 4 shows an example flow chart of a method of detecting and classifying an intrusion event in a network of computer devices, according to one or more embodiments.

Reference is now made to FIG. 4. FIG. 4 shows a flow chart 400 with operations for detecting an intrusion event in a network of computing devices (e.g., an IoT network). At operation 410 the gateway device 120 (or a server in communication with the gateway 120 over a network) monitors device performance and context parameters of the gateway device. At operation 420, the gateway 120 defines a steady-state operation based on expected performance of the device parameters. At operation 430, the gateway 120 compares the steady-state operation to the monitored device performance and context parameters. At operation 440, the gateway 120 activates a hybrid network intrusion detection technique to determine a presence of a network intrusion event.

Figure 5:
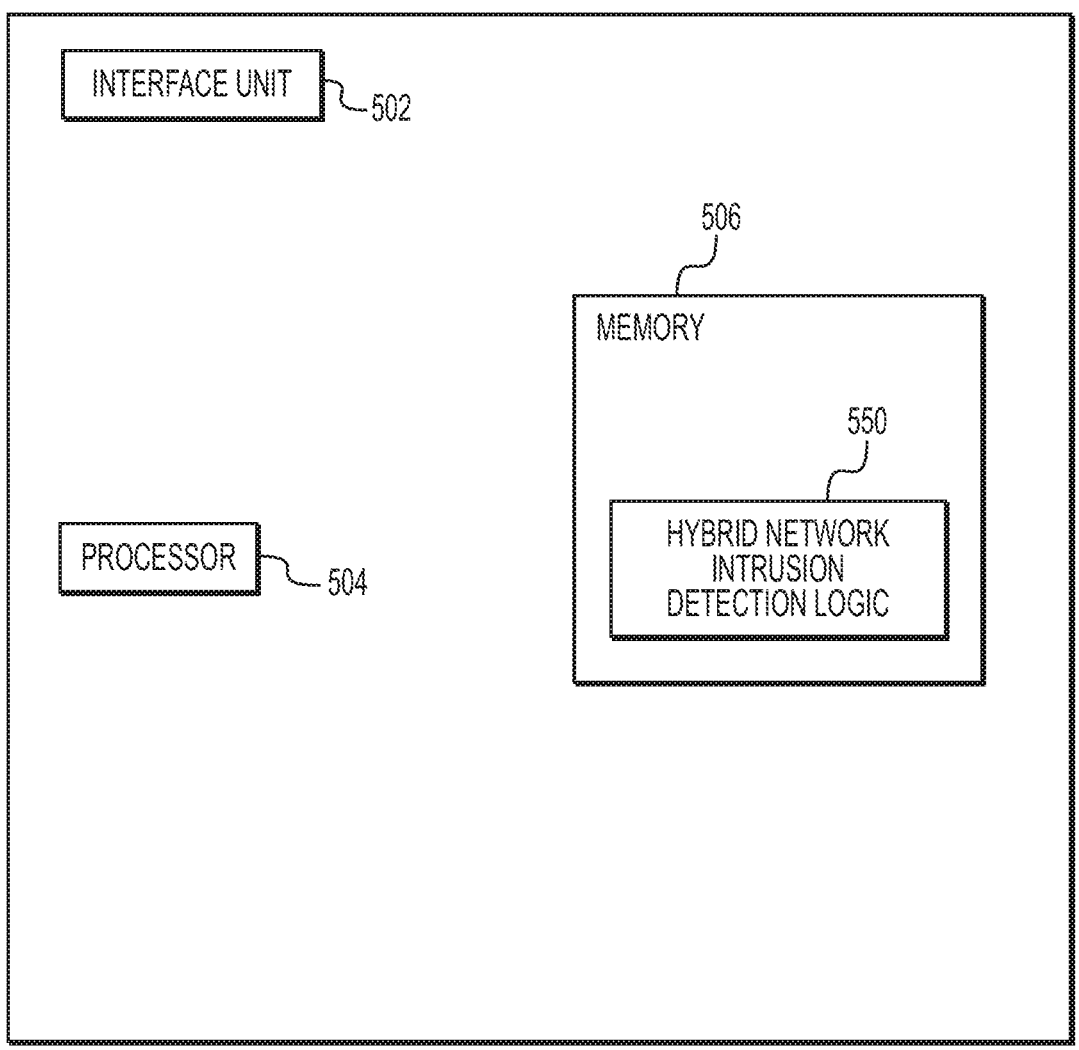
FIG. 5 shows an example block diagram of a network device configured to perform the hybrid network intrusion detection model, according to one or more embodiments.

FIG. 5 is a simplified functional block diagram of a device 500 that is configured to perform the hybrid network intrusion detection techniques described herein, according to exemplary embodiments of the present disclosure. In one example, the device 500 is the gateway 120, but may also be a server device in communication with the gateway 120.

In one example, the device 500 in FIG. 5 shows an interface unit 502, a processor 504, and a memory unit 506. The interface unit 502 is configured to send and receive data from devices in an IoT network. The processor 504 may be a central processing unit in the form of one or more processors, for executing program instructions. The device 500 may include an internal communication bus and a memory 506 configured for program storage and data storage for various data files to be processed and/or communicated, although the device 500 may receive programming and data via network communications. The memory 506 includes hybrid network intrusion detection logic 550 that includes instructions that when executed by the processor 504 cause the processor to perform the operations of the hybrid network intrusion detection techniques described herein. The device 500 also may include input and output ports to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. In one embodiment, any of the disclosed systems, methods, and/or graphical user interfaces may be executed by or implemented by a computing system consistent with or similar to the descriptions herein. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for detecting an intrusion event in a network of computing devices, the method comprising:
   at a gateway device in the network, monitoring device performance and context parameters of the gateway device using live data traffic and operational parameters;
   defining a steady-state operation based on expected performance of the device performance and context parameters;
   comparing the steady-state operation to the monitored device performance and context parameters; and
   activating a hybrid network intrusion detection technique, the hybrid network intrusion detection technique determining a presence of an intrusion event based on a comparison result of the comparing the steady-state operation to the monitored device performance and context parameters,
   wherein the hybrid network intrusion detection technique includes both a signature-based detection technique having a low computation overhead and an anomaly detection technique having a higher computation overhead than the signature-based detection technique.

2. The method of claim 1, wherein the hybrid network intrusion detection technique comprises:
   comparing the steady-state operations and the device performance and context parameters to a known network intrusion signature to determine a match; and
   using a first technique to detect the intrusion event when the comparing does not indicate the match; and
   using a second technique to activate an anomaly detection technique when the comparing does indicate the match.

3. The method of claim 2, wherein using the second technique comprises using the second technique when a new network intrusion event is detected.

4. The method of claim 2, wherein the anomaly detection technique is activated using a game theory approach.

5. The method of claim 4, wherein the game theory approach utilizes a Nash equilibrium to activate the anomaly detection technique.

6. The method of claim 2, wherein the anomaly detection technique comprises:
   simulating a network attack based on the monitored device performance and context parameters and the steady-state operations; and
   based on the simulating, determining whether the monitored device performance and context parameters are indicative of a new network intrusion event.

7. The method of claim 6, further comprising instructing an intrusion detection system to disable the new network intrusion event.

8. The method of claim 6, further comprising:
   generating a new network intrusion signature based on the new network intrusion event; and
   storing the new network intrusion signature in a database of signatures for network intrusion events.

9. A non-transitory computer-readable medium storing instructions that, when executed by one or more processors of a computer system, cause the processor to perform a method for detecting an intrusion event in a network of computing devices, the method comprising:
   monitoring device performance and context parameters of a gateway device;
   defining a steady-state operation based on expected performance of the device performance and context parameters using live data traffic and operational parameters;
   comparing the steady-state operation to the monitored device performance and context parameters; and
   activating a hybrid network intrusion detection technique, the hybrid network intrusion detection technique determining a presence of an intrusion event based on a comparison result of the comparing the steady-state operation to the monitored device performance and context parameters,
   wherein the hybrid network intrusion detection technique includes both a signature-based detection technique having a low computation overhead and an anomaly detection technique having a higher computation overhead than the signature-based detection technique.

10. The non-transitory computer-readable medium of claim 9, wherein the hybrid intrusion detection technique comprises:
   comparing the steady-state operations and the device performance and context parameters to a known network intrusion signature to determine a match; and
   using a first technique to detect the intrusion event when the comparing does not indicate the match; and
   using a second technique to activate an anomaly detection technique when the comparing does indicate the match.

11. The non-transitory computer-readable medium of claim 10, wherein using the second technique comprises using the second technique when a new network intrusion event is detected.

12. The non-transitory computer-readable medium of claim 10, wherein the anomaly detection technique is activated using a game theory approach.

13. The non-transitory computer-readable medium of claim 10, wherein the anomaly detection technique comprises:
   simulating a network attack based on the monitored device performance and context parameters and the steady-state operations; and
   based on the simulating, determining whether the monitored device performance and context parameters are indicative of a new network intrusion event.

14. The non-transitory computer-readable medium of claim 13, wherein the method further comprises instructing an intrusion detection system to disable the new network intrusion event.

15. A server device for detecting an intrusion event in a network of computing devices, comprising:
   an interface unit configured to receive information;
   a data storage device storing instructions for detecting an intrusion event in a network of computing devices; and
   a processor configured to execute the instructions to:
      monitor device performance and context parameters of a gateway device using live data traffic and operational parameters;
      define a steady-state operation based on expected performance of the device performance and context parameters;
      compare the steady-state operation to the monitored device performance and context parameters; and
      activate a hybrid network intrusion detection technique, the hybrid network intrusion detection technique determining a presence of an intrusion event based on a comparison result of the comparing the steady-state operation to the monitored device performance and context parameters,
      wherein the hybrid network intrusion detection technique includes both a signature-based detection technique having a low computation overhead and an anomaly detection technique having a higher computation overhead than the signature-based detection technique.

16. The server device of claim 15, wherein the processor is further configured to:
   compare the steady-state operations and the device performance and context parameters to a known network intrusion signature to determine a match; and
   use a first technique to detect the intrusion event when the comparing does not indicate the match; and
   use a second technique to activate an anomaly detection technique when the comparing does indicate the match.

17. The server device of claim 16, wherein the processor is further configured to use the second technique when a new network intrusion event is detected.

18. The server device of claim 16, wherein the anomaly detection technique is activated using a game theory approach.

19. The server device of claim 16, wherein the processor is further configured to:
   simulate a network attack based on the monitored device parameters and the steady-state operations; and
   based on the simulating, determine whether the monitored device parameters are indicative of a new network intrusion event.

20. The server device of claim 19, wherein the processor is further configured to instruct an intrusion detection system to disable the new network intrusion event.

* * * * *